No. 660,791. Patented Oct. 30, 1900.
J. P. EUSTIS.
TEA OR COFFEE POT STRAINER.
(Application filed May 23, 1898.)
(No Model.)
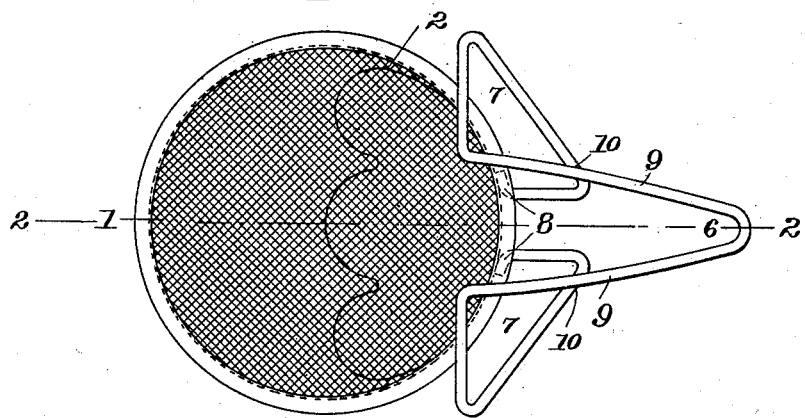
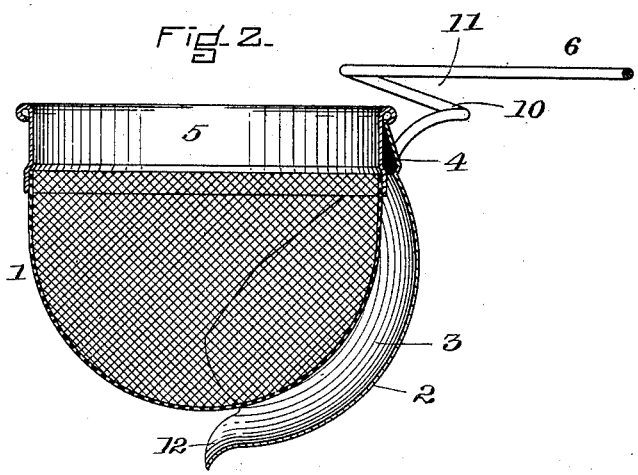
WITNESSES
INVENTOR
John P. Eustis.

UNITED STATES PATENT OFFICE.

JOHN P. EUSTIS, OF NEWTON, MASSACHUSETTS.

TEA OR COFFEE POT STRAINER.

SPECIFICATION forming part of Letters Patent No. 660,791, dated October 30, 1900.

Application filed May 23, 1898. Serial No. 681,436. (No model.)

*To all whom it may concern:*

Be it known that I, JOHN P. EUSTIS, of Newtonville, in the county of Middlesex and State of Massachusetts, have invented an Improvement in Tea or Coffee Pot Strainers, of which the following is a specification.

Reference being had to the accompanying drawings, Figure 1 is a top plan view, and Fig. 2 a sectional view on line 2 2 of Fig. 1, of my new tea and coffee pot strainer.

The object of my invention is to produce an improved strainer and drip-guard suitable for attachment to and removal from spouts of coffee and tea pots; and my invention consists, first, in the combination of a cup-like strainer with a shell-like drip-guard mounted on the rear lower side of the strainer with a space between the opposed walls of the strainer and of the drip-guard, and, secondly, in the peculiar form of clip hereinafter described.

In the drawings illustrating the best form of my invention now known to me, 1 is a cup-like strainer, of the usual form, and 2 is the shell-like drip-guard, of sheet metal. The drip-guard is concavo-convex in cross-section and is mounted at the rear of the strainer, extending downwardly toward the bottom thereof, with a space 3 between the rear outer wall of the strainer and the opposed or inner wall of the guard 2. The drip-guard is preferably attached rigidly at 4 to the usual band 5 of the strainer. The clip by means of which the combined strainer and drip-guard is attached to or removed from spouts of tea and coffee pots may be of any desired form; but I prefer to make it of wire bent to form the spring-tongue 6, with integral compressive and laterally and rearwardly extending angular portions 7, the extremities 8 8 of which wire are secured to the rear portion of the rim 5 by soldering or otherwise, as may be desired. The side portions 9 of the tongue project rearwardly of the strainer over and outwardly beyond the portions 10 of the clip to form the spout-receiving space 11 between the under side of the tongue and the upper side of the portions 10. By compression upon the angular portions 7 of the clip the side members of the tongue are squeezed toward each other and the tongue is ready to be inserted in the nozzle of the coffee or tea pot. When the pressure is relieved, the clip holds the combined strainer and drip-guard in place, the under portions of the mouth of the spout being between the side members of the tongue and the portions of the bent wire underneath the side portions of the tongue, the side portions of the tongue pressing against the inner sides of the spout. In this position any drip from the spout will be caught and retained in the shell-like drip-guard, which may be extended somewhat farther toward the front of the strainer than is here shown if so desired. The front portion of the strainer is left free for the flow of the liquid from the spout to the cup. As the mouth of the nozzles or spouts of coffee and tea pots are usually downwardly and rearwardly inclined, it will be understood that when the tongue 6 of the cup is inserted in the spout the drip-guard will be directly underneath the spout. If, however, the mouth of the spout should be more nearly horizontal, the rearwardly-projecting clip could be bent downwardly, so as to bring the drip-guard underneath the mouth of the spout. The open space between the opposed walls of the strainer and drip-guard forms a sort of settlings-chamber, which is readily accessible for cleansing, because the lower front edge 12 of the drip-guard is at some distance from the opposed portion of the strainer. The lower front edge at 12 is concavo-convex and downwardly deflected. It is to be understood that when these strainers are in use the cup comes under the mouth of the nozzle of the coffee or tea pot, so that the drip flows into this cup or drip-guard. By reason of the limitation of the cup or drip-guard 12 to the rear and lower portion of the strainer it becomes feasible in tipping the pot-nozzle downwardly for the liquid in the drip-guard or cup to flow out. That portion of the drip-guard at 12 is in effect a concavo-convex downwardly-deflected lip.

What I claim is—

1. As a new article of manufacture, the combination of a concavo-convex straining-cup having a sheet-metal, brim-forming band with a sheet-metal drip-guard attached to the rear portion of said sheet-metal band and extending thence forwardly and also downwardly to near the bottom of the straining-cup; the opposed walls of the drip-guard and straining-cup being at a fixed distance apart; and a spring-clip which is attached to the rear side of said brim and has a spring-tang which extends rearwardly in parallelism with the top of said brim; the inner end of the spring-tang projecting inwardly over that portion of the strainer which is opposed to the drip-guard; and the tang being formed at said inner portions with abutments which are adapted to engage the mouth of the pot-nozzle, within which the spring-tang is inserted, to hold the drip-guard fixed under the mouth of said pot-nozzle.

2. The combination with a pot-strainer of a spring-clip composed of a bent wire whose ends are attached to the rear side of the strainer, and whose end portions thence extend rearwardly from the strainer, then forwardly and outwardly, and then inwardly, and which is formed into an angular-shaped tongue which passes rearwardly above the forwardly and outwardly bent portions of the wire.

In testimony whereof I have hereunto signed my name to this specification, in the presence of two subscribing witnesses, on this 13th day of May, A. D. 1898.

JOHN P. EUSTIS.

Witnesses:
E. A. ALLEN,
EDWARD S. BEACH.